United States Patent [19]

Person

[11] Patent Number: 5,249,655
[45] Date of Patent: Oct. 5, 1993

[54] CONTROL AND ACTUATION SYSTEM FOR HYDRAULICALLY ACTUATED CLUTCH AND BRAKE

[75] Inventor: Dennis W. Person, Canton, Mich.

[73] Assignee: Ford Motor Company, Dearborn, Mich.

[21] Appl. No.: 937,264

[22] Filed: Aug. 31, 1992

[51] Int. Cl.⁵ ............................................. F16D 67/04
[52] U.S. Cl. ............................ 192/17 A; 192/12 C
[58] Field of Search ............... 192/17 A, 12 C, 13 R, 192/12 R

[56] References Cited

U.S. PATENT DOCUMENTS

| | | | |
|---|---|---|---|
| 3,550,735 | 12/1970 | Olsen | 192/17 A |
| 4,336,869 | 6/1982 | Tsutsumi | 192/13 R |
| 4,407,399 | 10/1983 | Wolff | 192/12 C X |
| 4,549,640 | 10/1985 | Sekino | 192/17 A X |
| 4,774,857 | 10/1988 | Heine et al. | 192/12 C X |
| 5,058,717 | 10/1991 | Haglund | 192/13 R X |

FOREIGN PATENT DOCUMENTS 823184  4/1981  U.S.S.R. ........................ 192/13 R

OTHER PUBLICATIONS

Toyota Lexus 1990 Repair Manual, vol. 1, p. AT-95.

*Primary Examiner*—Leslie A. Braun
*Assistant Examiner*—Andrea Pitts
*Attorney, Agent, or Firm*—Frank G. McKenzie; Roger L. May

[57] ABSTRACT

Two solenoid-actuated shuttle valves selectively direct hydraulic fluid from a line pressure source to a clutch and brake servo or direct fluid from the clutch and servo to a low pressure drain, in accordance with the combined states of the solenoids. The system includes several orifices, which in combination control the rate of flow between the pressure source and the friction elements. The orifices control also the flow rate in the system between the friction elements and drain ports. Accumulators are located in the system between the shuttle valves and the friction elements. An arrangement of check valves and orifices located between the shuttle valves and the accumulators establish the rate of flow between each of the accumulators and the associated friction element.

14 Claims, 2 Drawing Sheets

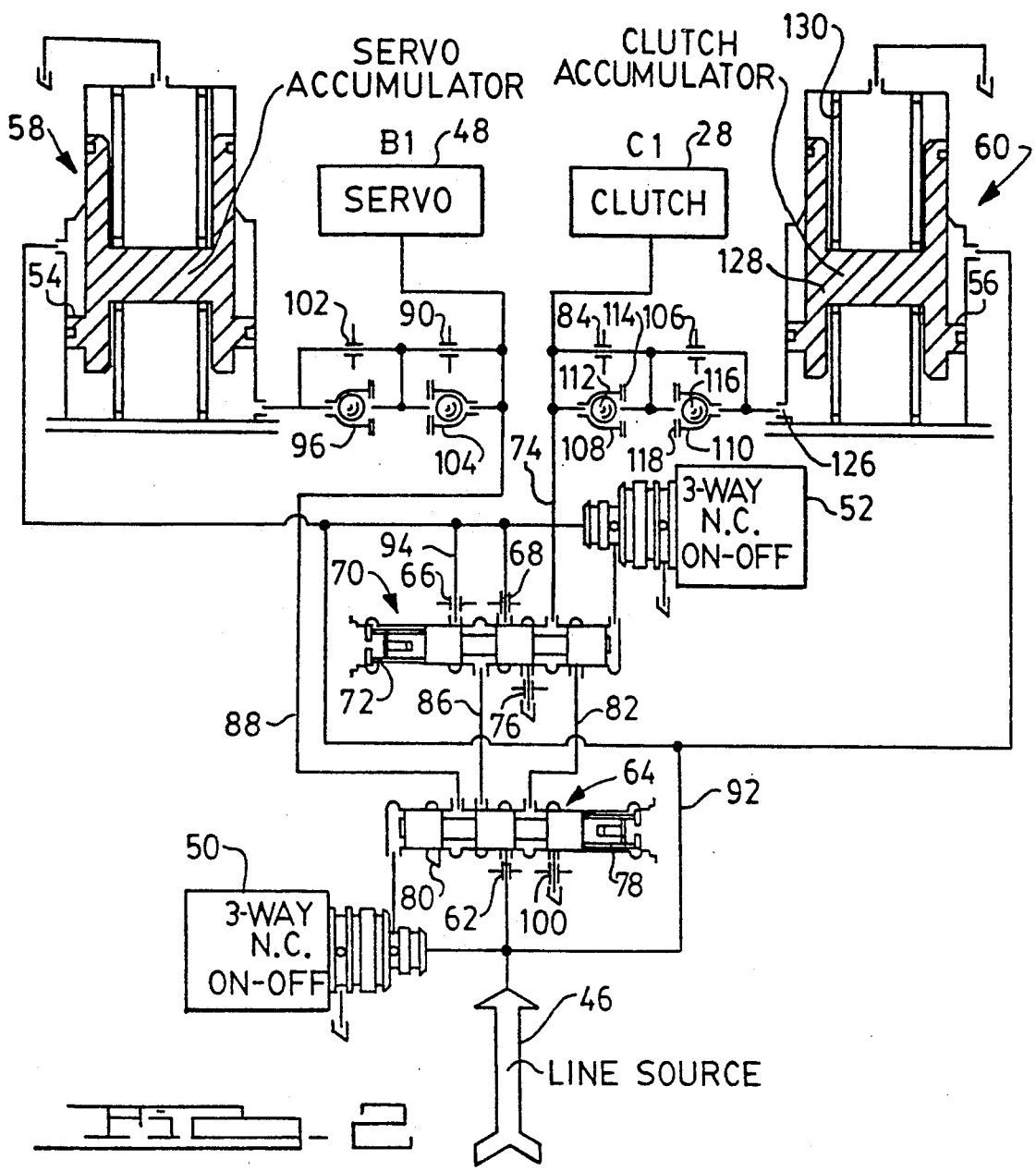

CONTROL AND ACTUATION SYSTEM FOR HYDRAULICALLY ACTUATED CLUTCH AND BRAKE

BACKGROUND OF THE INVENTION

1. Field of the Invention

This invention relates to the field of automatic transmission controls. More particularly it pertains to solenoid-actuated hydraulic control circuitry for selectively engaging and releasing a brake servo and friction clutch in an automatic tranmission.

2. Description of the Prior Art

In an automatic transmission brake bands are used to hold elements of a gearset against rotation by frictionally engaging the outer surface of a brake drum to which a gearset element is driveably connected. The brake band is applied and released through operation of a brake servo, an hydraulic cylinder supplied with pressurized hydraulic fluid and containing a double acting piston connected to the brake band. It is conventional practice that the same pressure be applied to the apply-side of the servo piston and to the release-side of the servo piston. The effective area of the release-side of the piston is somewhat larger than that of the apply-side.

An alternate conventional servo, in which the piston areas are of equal size, includes a valve that reduces line pressure to the apply-side in relation to the pressure at the release-side of the piston. These techniques are employed to ensure that the servo will release the brake band yet have torque capacity sufficient to hold the brake without slipping.

In certain applications in an automatic transmission, operation of one friction element such as a brake band must be synchronized with the application and release of a clutch such that neither of the friction elements is concurrently applied and torque carried by the off-going friction element is transferred smoothly to the on-coming friction element. A technique for producing this effect is to regulate the flow of hydraulic fluid from a pressure source to the friction elements and from the friction elements to exhaust by directing the flow through orifices of predetermined sizes selected to coordinate friction element operation. In the prior art an arrangement of check valves and orifices has been developed to direct fluid through one orifice while a friction element is being engaged and to direct fluid through a different orifice when the friction element is being vented.

SUMMARY OF THE INVENTION

An object of this invention is to provide a system for synchronizing the application and release of two friction elements controlled by operation of a single acting hydraulic piston in which pressure is applied to only one side of the piston.

The system according to this invention includes two shuttle valves, each valve controlled by an on/off solenoid and connected to a line pressure source, one of the valves being connected also to a first friction clutch, the other valve being connected to a second friction clutch. The system includes multiple combinations of orifices of predetermined size located both in the passages or lines that carry line pressure to apply the friction elements and in the passages that connect the friction elements to an exhaust port.

The solenoids that operate the shuttle valve produce four discrete states. One of these states exhausts both of the friction elements, a second state causes the clutch alone to be engaged; the third and fourth states apply the brake and release the clutch selectively using alternate orifices through which the clutch is exhausted and alternate orifices through which the brake is applied. This aletrnate selection of orifices controls the rate of flow of hydraulic pressure to and from the friction elements. It is particularly suited to the process of calibrating the system for use in powertrains driven by different engines and having a variable torque supplied at the input of the gearset that is controlled by the friction elements.

Additional calibration flexibility is provided by including an arrangement of check valves and orifices located in a line connecting each of the friction elements to an associated accumulator. Each of the accumulators includes a piston biased by a compression spring whose spring constant determine the shape or slope of the pressure of the fluid stored and delivered by the accumulator to the system. The arrangement of ball check valves and orifices in the line between the accumulator and the associated friction element determines the amount of time required to stroke the accumulator. This combination of components establishes the slope of the pressure curve of the fluid contained in the accumulator and controls operation of the friction clutch such that it operates compatibly with the torque requirements of the friction elements and synchronizes its operation with that of the other friction element of the system.

BRIEF DESCRIPTION OF THE DRAWINGS

FIG. 2 is a schematic diagram of an hydraulic circuit used to pressurize and vent the clutch and servo for the brake band of the auxiliary transmission of FIG. 1.

FIG. 3 is a schedule showing the state of the clutch and brake of FIG. 2.

DESCRIPTION OF THE PREFERRED EMBODIMENT

Figure 1:
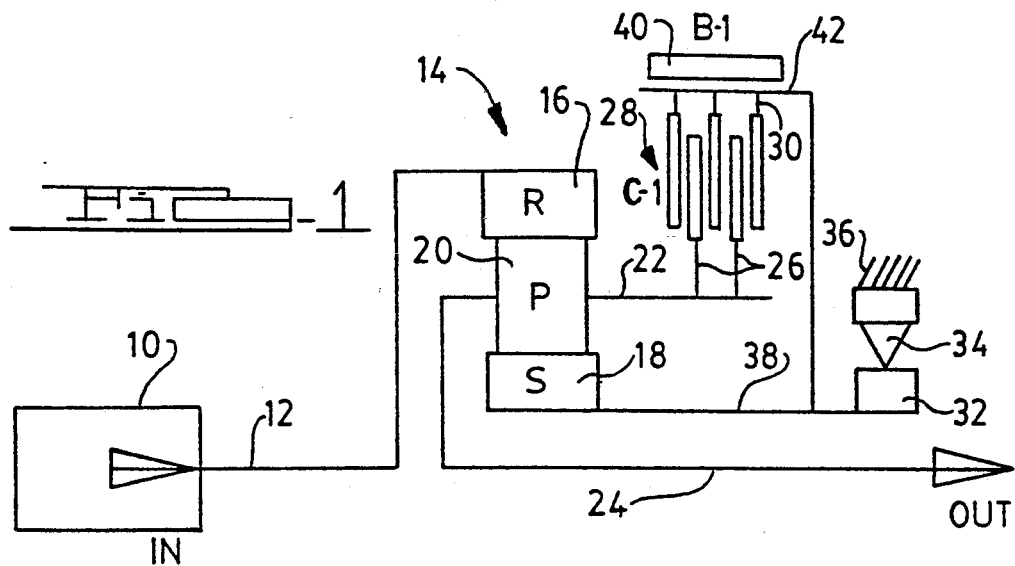
FIG. 1 is a schematic diagram of a planetary gearset clutch and brake band arrangement for an auxiliary transmission.

Referring first to FIG. 1, an automatic transmission 10 for producing multiple forward speed ratios is driveably connected through shaft 12 to a planetary gearset 14, which includes ring gear 16, sun gear 18 and a set of planet pinions 20 meshing with the ring gear and sun gear. The planet pinions are rotatably supported on a planet pinion carrier 22, which is driveably connected to output shaft 24 and to friction discs 26 of an hydraulically actuated friction clutch 28. The spacer plates 30 of the clutch are driveably connected to sun gear 18 and to the inner race 32 of a one-way brake 34, whose outer race is fixed on the transmission casing 36 against rotation. Brake 34 produces a one-way drive connection between the shaft 38, which driveably connects the spacer plates 30 and sun gear 18 to the transmission case 36.

Brake band 40, applied by pressurizing the hydraulically actuated servo 48, connects brake drum 42 to the transmission housing against rotation and releases the brake drum when the servo is vented. Brake drum 42 is driveably connected to spacer plates 30, sun gear 18 and the inner race 32 of coupling 34.

In operation, the device of FIG. 1 is used to produce a direct drive connection for a forward gear ratio and a speed reduction during a reverse drive condition. During the forward drive condition, clutch 28 is engaged and brake band 40 is released. This action driveably connects carrier 22 and sun gear 18 and allows one-way coupling 34 to overrun. Therefore, carrier 22 and output shaft 24 are driven at the speed of the input shaft 12. During a coast condition in the forward drive ratio, pinions 20 drive the ring gear 16, and clutch 28 driveably connects sun gear 18 to the pinions.

The main gear box 10 reverses the direction of shaft 12 when reverse gear is selected and the gear/clutch mechanism of FIG. 1 driveably connects shaft 12 to shaft 24 with a speed reduction. To produce this result, clutch 28 is disengaged and band 40 is applied. This action holds sun gear 18 against rotation on the transmission housing, coupling 34 has no differential speed or torque between its inner race 32 and the transmission housing, sun gear 18 provides the gearset reaction, and carrier 22 is driven by ring gear 16. During a coast condition in the reverse drive range, ring gear 16 is driven by the planet pinions, which rotate on the sun gear 18 as the pinion carrier 22 rotates.

Referring now to hydraulic control system of FIG. 2, a source of line pressure 46 supplies pressurized hydraulic fluid at line pressure to a circuit that controls operation of clutch 28 and the servo 48 that actuates brake 40. Line pressure is directed to solenoids 50, 52, piston bias areas 54, 56 of a servo accumulator 58 and clutch accumulator 60, respectively, orifice 62 of a servo shuttle valve 64, and orifices 66, 68 of a clutch shuttle valve 70.

Solenoid 52 controls clutch shuttle valve 70, solenoid 60 controls the servo shuttle valve 64. The two solenoids provide four states which allow the clutch 28 and brake band 40 to be applied according to the state table shown in FIG. 3. The solenoid operated valves are three-way N.C. on-off solenoids.

As shown in the table of FIG. 3, one state is provided in which neither the clutch nor the band is applied. When solenoid 52 is on, the clutch shuttle valve 70 is stroked leftward against compression spring 72, and clutch pressure carried in line 74 is vented through orifice 76. When solenoid 50 is off, the servo shuttle valve 64 is stroked leftward by compression spring 78, thereby exhausting servo pressure in line 88 through exhaust port 80 at the servo shuttle valve.

A default state is provided in which only clutch 28 is applied. This state occurs when both solenoids are off. In this case, servo shuttle valve 64 is stroked to the left by spring 78 and clutch shuttle valve is stroked to the right by spring 72. Then line pressure is connected through orifice 62 to the servo shuttle valve 64 and through passage 82 to the clutch shuttle valve 70. The ports of the clutch shuttle valve allow line pressure to be connected to the clutch through passage 74. Orifice 62, orifice 84 and the clutch accumulator 60 control application of the clutch. Because solenoid 50 is off, servo pressure is exhausted through passage 88 and the exhaust port 80.

As shown in the state table of FIG. 3, two states are provided in which brake band 40 is applied and clutch 28 is exhausted. When solenoid 50 is on, the servo shuttle valve 64 is stroked rightward against spring 78. This action opens a connection between line pressure source 46 through clutch shuttle valve 70 and passage 86 to servo passage 88 and servo 48. The state of solenoid 52 then controls the clutch shuttle valve and determines whether the band is applied through orifice 66 or orifice 68. When solenoid 52 is off, valve spool 90 moves rightward due to the effect of spring 72 and the servo accumulator 58 is filled through orifice 68, passages 86 and 88, and orifice 90. When solenoid 52 is on, the clutch shuttle valve moves leftward and the servo accumulator 58 is pressurized from line pressure source 46, passages 92, 94, orifice 66, passages 86, 88, orifice 90 and check valve 96. During the two states while solenoid 50 is on and solenoid 52 is either on or off, clutch 28 is vented. The clutch is vented through passage 74, the clutch shuttle valve and orifice 76 when solenoid 52 is on. Clutch 28 is vented through passages 74, 82 and orifice 100 when solenoid 52 is off.

When solenoid 50 is on, the line pressure source 46 is blocked at the servo shuttle valve 64 and passage 82 is vented through orifice 100. When solenoid 50 is on, the state of solenoid 52, through its controls of the state of clutch shuttle valve 70, determines whether clutch pressure is vented through orifice 76 or orifice 100. The state of solenoid 52, therefore, controls selection of the orifice through which servo 48 is pressurized and the orifice through which clutch 28 is vented.

The two orifices 90 and 102 and two check valves 96, 104 that connect passage 88 to the servo accumulator 58 operate to provide additional calibration flexibility during application and exhaust of servo 48. The two orifices 84 and 106 and two check valves 108, 110 that connect passage 70 to clutch 28 operate to provide additional calibration flexibility during application and exhaust of clutch 28. When clutch is applied, clutch pressure forces the ball 112 of check valve 108 to seal the hole in separator plate 114, thereby directing hydraulic fluid through orifice 84 and check valve 110 to accumulator 60 and bypassing orifice 106. When the clutch is vented, clutch accumulator pressure at port 126 forces ball 116 to seal the hole in separator plate 118, thereby directing hydraulic fluid from the accumulator through orifice 106 and check valve 108 and bypassing orifice 84.

When servo 48 is applied, servo pressure in passage 86 forces the ball of check valve 104 to seal the hole in the adjacent separator plate, thereby directing hydraulic fluid through orifice 90 and check valve 96 and bypassing orifice 102. When the servo is exhausted, servo pressure forces the ball of check valve 96 to seal the hole in the separate plate, thereby directing hydraulic fluid from the accumulator 58 through orifice 102 and check valve 104 and bypassing orifice 90.

This arrangement of ball check valves and orifices of FIG. 2 causes hydraulic fluid to flow through one orifice while hydraulic fluid flows in a first direction and through a different orifice if the flow direction is in another direction.

Figure 4:
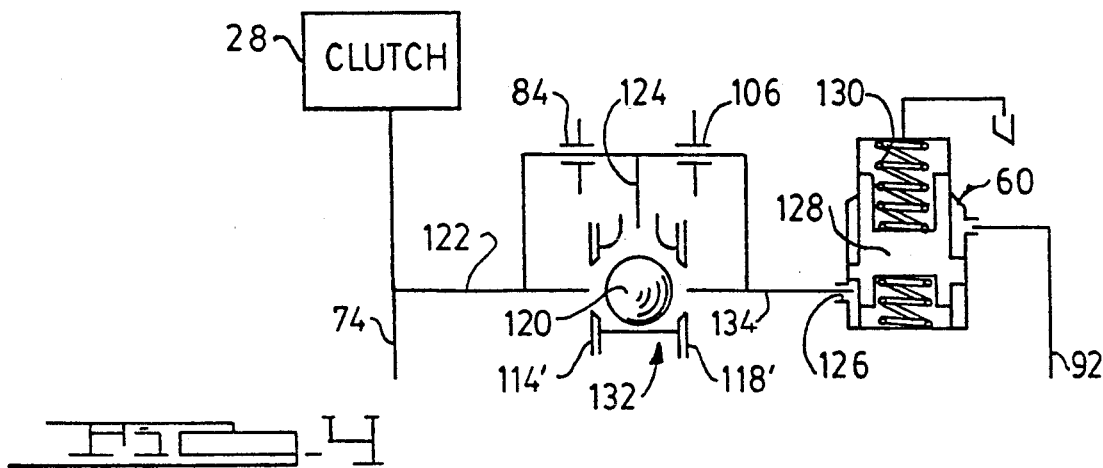
FIG. 4 is a schematic diagram of an alternative embodiment of the check valves and orifices in the circuit of FIG. 1.

In the arrangement of FIG. 4 the same effect is accomplished with a ball check valve 132 having only one ball 120. In the arrangement shown schematically in FIG. 4, when hydraulic pressure is supplied to clutch 28 through passage 74, ball 120 seals separator plate 118' and directs hydraulic fluid through passages 122, 124, orifice 106, and passage 134 to the accumulator port 126. This forces piston 128 of accumulator 60 upward against spring 130 and the effect of line pressure supplied through passage 92. When the direction of fluid flow is from the accumulator port 126, ball 120 seals separator plate 114' and directs hydraulic fluid through passages 134, 124, orifice 84 and passage 122.

Figure 5:
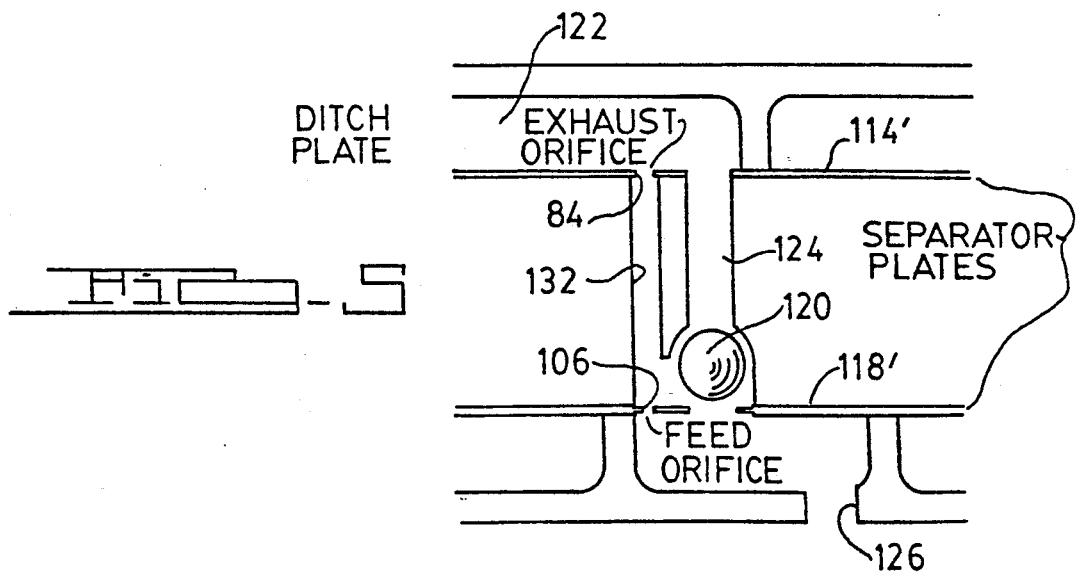
FIG. 5 is a cross section through the valve body showing the check valve and orifice arrangement of FIG. 3.

Refer now to the cross section shown in FIG. 5. A ditch plate or transfer plate 136 is a plate like a valve body for directing fluid along passages formed on one side of the plate only but having no valves. A ditch plate is generally bolted to the valve body. When the direction of fluid flow is toward the accumulator port 126, ball 120 is forced downward to a sealing seating position on separator plate 118'. Therefore, flow is forced through passage 124 and feed orifice 106 to the accumulator feed port 126. When flow direction is reversed, ball 120 is forced upward, sealing passage 124 and directing flow through passage 132 and exhaust orifice 84.

I claim:

1. A system for controlling engagement and release of hydraulically operated friction elements, comprising:
   a source of fluid pressure (46);
   a low pressure exhaust;
   first and second friction elements (28, 48);
   a first shuttle valve (64) having control lands on a valve spool moveable between first and second states, at which valve ports connected to the fluid pressure source, second friction element, a second shuttle valve (70) and exhaust are opened and closed, wherein
   the first shuttle valve when in its first state opens a connection between the pressure source and the first friction element through said second shuttle valve, and opens a connection between the second friction element and the exhaust;
   the first shuttle valve when in its second state opens a connection between the pressure source and second friction element through the second shuttle valve and opens the first friction element to exhaust;
   the second shuttle valve (70) having control lands on a valve spool moveable between first and second states, at which valve ports connected to the fluid pressure source, first friction element, first shuttle valve and an exhaust port are opened and closed, wherein
   the second shuttle when in its first state opens a connection between the pressure source and the second friction element through the first shuttle valve, and opens a connection between the first friction element and said exhaust port; and the second shuttle valve when in its second state opens a connection between the pressure source and the second friction element through the first shuttle valve, and opens the first friction element to one of exhaust and the pressure source depending on the state of the first shuttle valve.

2. The system of claim 1 wherein:
   the first state of the first shuttle valve further closes a connection between the first friction element and exhaust through the second shuttle valve, and closes a connection between the pressure source and the second friction element through the second shuttle valve; and
   the second state of the first shuttle valve further closes a connection between the pressure source and the first friction element through the second shuttle valve, and closes a connection between the second friction element and exhaust.

3. The system of claim 1, further comprising:
   first accumulator means (60) communicating with the pressure source and the first friction element for storing and releasing fluid; and
   second accumulator means (58) communicating with the pressure source and the second friction element for storing and releasing fluid.

4. The system of claim 1, further comprising:
   a first solenoid (50) connected to the valve spool of the first shuttle valve for moving said valve spool between its first and second states; and
   a second solenoid (52) connected to the valve spool of the second shuttle valve for moving said valve spool between its first and second states.

5. The system of claim 1, further comprising a first orifice (62) located between the pressure source and the first shuttle valve through which the first friction element is pressurized when the first shuttle valve is in its first state;

6. The system of claim 1 further comprising:
   a second orifice (66) located between the pressure source and the second shuttle valve through which the second friction element is pressurized when the second shuttle valve is in its first state and the first shuttle valve is in its second state; and
   a third orifice (68) located between the pressure source and the second shuttle valve through which the second friction element is pressurized when the second shuttle valve is in its second state and the first shuttle valve is in its second state.

7. The system of claim 5, further comprising:
   a second orifice (66) located between the pressure source and the second shuttle valve through which the second friction element is pressurized when the second shuttle valve is in its first state and the first shuttle valve is in its second state; and
   a third orifice (68) located between the pressure source and the second shuttle valve through which the second friction element is pressurized when the second shuttle valve is in its second state and the first shuttle valve is in its second state.

8. The system of claim 1 further comprising:
   a fourth orifice (76) located between the second shuttle valve and exhaust through which the first friction element is exhausted;
   a fifth orifice (100) located between the first shuttle valve and exhaust through which the first friction element is exhausted.

9. A system for controlling engagement and release of hydraulically operated friction elements, comprising:
   a source of fluid pressure (46);
   a low pressure exhaust;
   first and second friction elements (28, 48);
   first shuttle valve means (50, 64) for opening a connection between the pressure source and the first friction element through a second shuttle valve means, opening a connection between the second friction element and exhaust, opening a connection between the pressure source and the second friction element through the second shuttle valve means, and opening the first friction element to exhaust; and
   second shuttle valve means for opening a connection between the pressure source and the second friction element through the first shuttle valve means, opening a connection between the first friction element and exhaust, opening a connection between the pressure source and the second friction element through the first shuttle valve means, and opening the first friction element to one of exhaust and the pressure source through the first shuttle valve means.

10. The system of claim 9 wherein the first shuttle valve means further closes a connection between the first friction element and exhaust through the second shuttle valve means, closes a connection between the pressure source and the second friction element through the second shuttle valve means, closes a connection between the pressure source and the first friction element through the second shuttle valve means, and closes a connection between the second friction element and exhaust.

11. The system of claim 9, further comprising:
   first accumulator means (60) communicating with the pressure source and the first friction element for storing and releasing fluid;
   second accumulator means (58) communicating with the pressure source and the second friction element for storing and releasing fluid.

12. The system of claim 9, further comprising a first orifice (62) located between the pressure source and the first shuttle valve means through which the first friction element is pressurized when the first shuttle valve means is in its first state.

13. The system of claim 9 further comprising:
   a second orifice (66) located between the pressure source and the second shuttle valve means through which the second friction element is pressurized when the second shuttle valve means is in its first state and the first shuttle valve means is in its second state; and
   a third orifice (68) located between the pressure source and the second shuttle valve means through which the second friction element is pressurized when the second shuttle valve means is in its second state and the first shuttle valve means is in its second state.

14. The system of claim 12, further comprising:
   a second orifice (66) located between the pressure source and the second shuttle valve means through which the second friction element is pressurized when the second shuttle valve means is in its first state and the first shuttle valve means is in its second state; and
   a third orifice (68) located between the pressure source and the second shuttle valve means through which the second friction element is pressurized when the second shuttle valve means is in its second state and the first shuttle valve means is in its second state.

* * * * *